United States Patent [19]

Dauvegne et al.

[11] Patent Number: 4,949,585
[45] Date of Patent: Aug. 21, 1990

[54] TELESCOPIC SCREW JACK FOR THE ADJUSTMENT OF AN ELEMENT SUCH AS A VEHICLE SEAT

[75] Inventors: Jean L. Dauvegne, Fosses; Claude Chevance, Savigny-sur-Orge; Bruno Laurent, Paris, all of France

[73] Assignee: Rockwell-CIM, France

[21] Appl. No.: 270,972

[22] Filed: Nov. 14, 1988

[30] Foreign Application Priority Data

Nov. 20, 1987 [FR] France ............................ 87 16122

[51] Int. Cl.⁵ .......................................... F16H 25/20
[52] U.S. Cl. ................... 74/89.15; 74/89.14; 74/424.8 R; 74/424.8 B; 254/102; 297/330
[58] Field of Search ............... 74/424.8 R, 459, 89.15, 74/89.14, 424.8 B; 248/422; 254/102; 297/330

[56] References Cited

U.S. PATENT DOCUMENTS

| | | | |
|---|---|---|---|
| 2,724,284 | 11/1955 | Anderson et al. | 74/459 |
| 4,050,318 | 9/1977 | Wolf | 74/89.15 |
| 4,100,850 | 7/1978 | Wolbrink et al. | 74/89.15 X |
| 4,493,478 | 1/1985 | Fortgens | 74/424.8 R X |
| 4,712,969 | 12/1987 | Kimura | 74/89.15 X |

FOREIGN PATENT DOCUMENTS 368750  3/1932  United Kingdom ................ 254/102

*Primary Examiner*—Allan D. Herrmann

[57] ABSTRACT

The jack comprises a tubular primary screw (10) provided with an outer screw thread and an inner screw thread having opposite thread hands, a secondary screw (11) cooperative with the inner screw thread and having an end (11a) articulated to a fixed point, a nut (9) fixed in rotation and connected to move in translation with the element to be adjusted and cooperative with the outer screw thread, a speed reducer associated with a motor (M) for driving the primary screw (10) in rotation, and means for preventing a rotation of the speed reducer (13) relative to the nut (9). These means comprise an articulated compass structure (18) having two branches (18a, 18b) articulated together. One of the branches is also articulated to the speed reducer (13) while the other branch is articulated to a part (9) of the jack which is fixed in rotation. The compass structure (18) considerably reduces the friction and improves the efficiency of the jack.

10 Claims, 5 Drawing Sheets

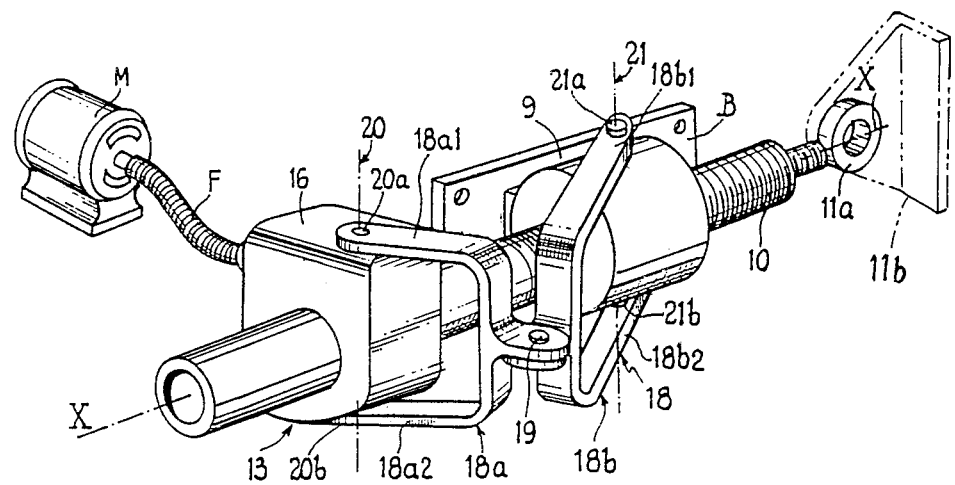
FIG_1
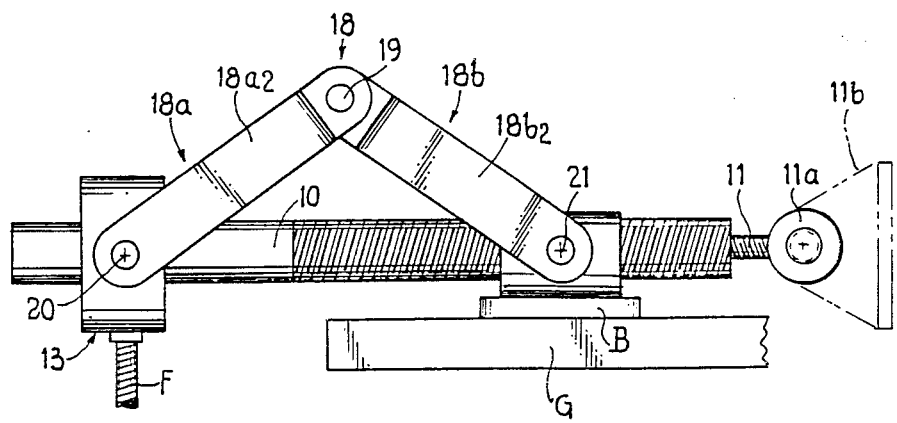
FIG_3

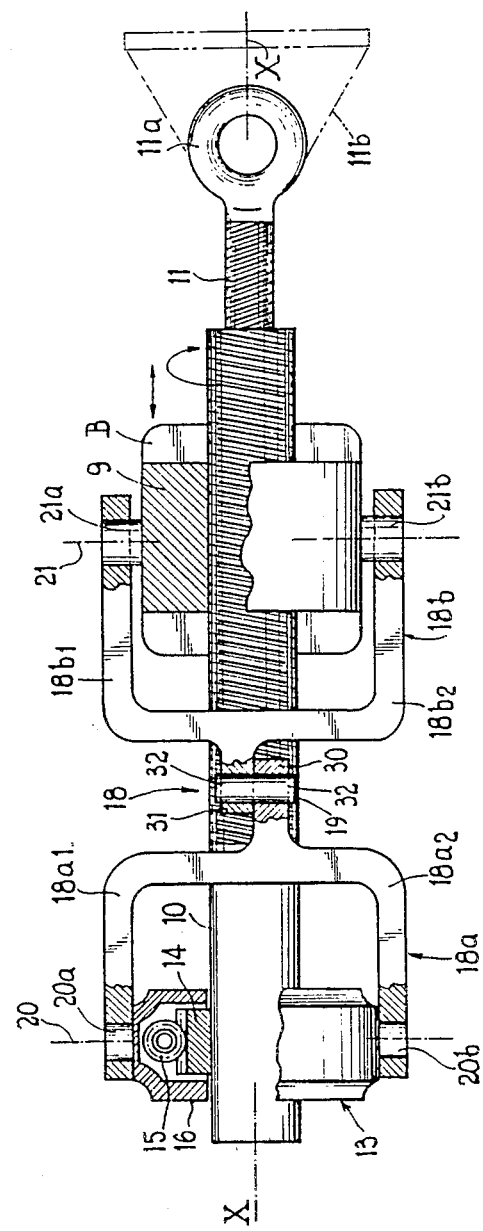
FIG_2

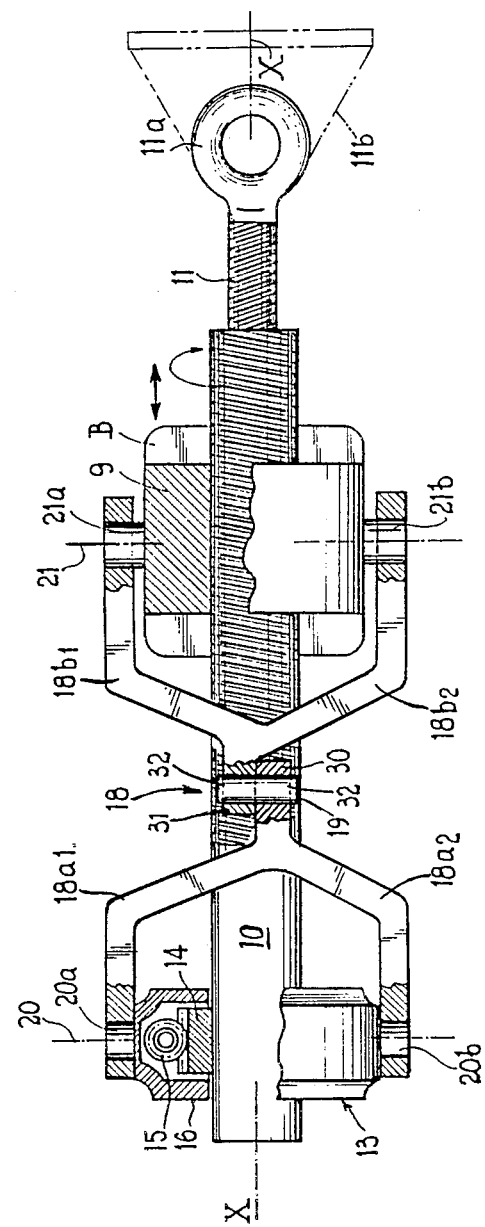
FIG_2a

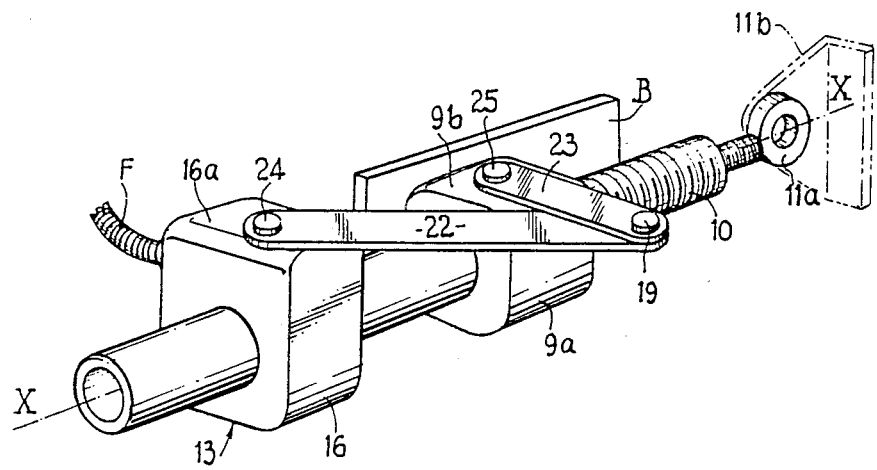
FIG_4

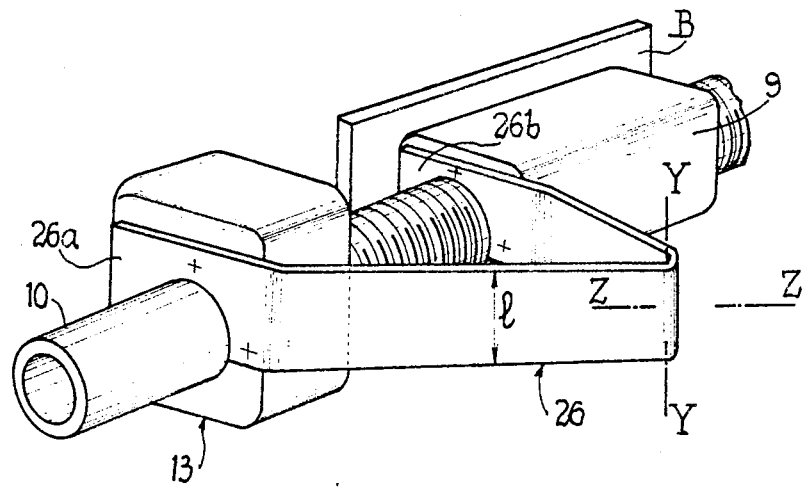
FIG_5
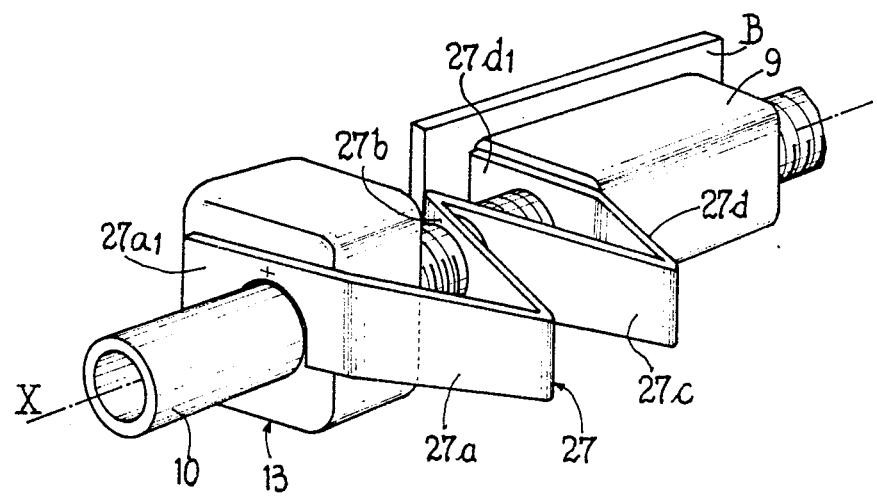
FIG_6

TELESCOPIC SCREW JACK FOR THE ADJUSTMENT OF AN ELEMENT SUCH AS A VEHICLE SEAT

The present invention relates to a telescopic screw jack for the adjustment of an element such as a motor vehicle seat.

A jack of this type is known in particular from the French patent No. 79 01 741 (publication No. 2 447 494) which comprises a primary tubular screw provided with an outer screw thread, an inner screw thread having opposite thread hands, a secondary screw cooperative with the inner screw thread and having an end which is articulated to a fixed point, a nut fixed against rotation, connected to move in translation with the element to be adjusted and cooperative with the outer screw thread, a speed reducer associated with driving means for driving the primary screw in rotation, and means for preventing a rotation of the motor-speed reducer device relative to the general axis of the jack, i.e. the common axis of the two screws and the nut.

The telescopic jack of the present invention may also be of the type disclosed in the French patent application No. 87 13 917 of Oct. 8, 1987 in the name of the Applicant.

The anti-twist means with which the jack of the aforementioned French patent is provided may be replaced by a rod fixed to the housing of the speed reducer and engaged moreover in the nut fixed against rotation.

However, these known solutions have the common drawback of creating considerable friction which has an adverse effect on the efficiency of the telescopic jack since the work they perform is appreciable.

The invention has for object to provide a jack of the aforementioned type in which the anti-twist means are so arranged as to create a minimum amount of friction and thereby ensure that the jack has an efficiency which is markedly higher than that of the known prior jacks.

According to the invention, the means for preventing the rotation of the speed reducer relative to the nut comprise an articulated compass structure having two branches articulated together, one of said branches being also articulated to the speed reducer while the other branch is articulated to a part of the jack which is fixed in rotation.

The torque tending to rotate the speed reducer about the axis of the primary screw is therefore transmitted to said part fixed in rotation, which is preferably the nut, by the pins articulating the branches of the compass structure to the speed reducer and to the part fixed in rotation and the pin articulating the branches together, which considerably reduces friction.

According to an embodiment of the invention, the two branches of the compass structure are articulated together by a pin orthogonal to the general axis of the primary screw, the nut and the secondary screw and transversely offset relative to this general axis.

Further features and advantages of the invention will be apparent from the following description with reference to the accompanying drawings which illustrate four embodiments thereof by way of non-limitative examples.

In the drawings:

FIG. 1 is a perspective view of an embodiment of the telescopic screw jack provided with an anti-twist device according to the invention;

FIG. 2 is a longitudinal sectional view partly in elevation of the jack shown in FIG. 1;

FIG. 2a is a longitudinal sectional view partly in elevation of an alternative of the jack shown in FIG. 1;

FIG. 3 is an elevational view of the jack in a plane perpendicular to the plane of FIG. 2;

FIGS. 4 to 6 are perspective views of three other embodiments of the jack according to the invention.

The jack shown in the drawings is a telescopic screw jack adapted to adjust the position of an element such as for example a vehicle seat whose longitudinal position or height above the floor is desired to be adjusted.

This jack (FIGS. 1 to 3) comprises a primary tubular screw 10 provided with an outer screw thread and an inner screw thread of opposite thread hands, a secondary screw 11 cooperative with the inner screw thread of the primary screw 10 and having an end 11a articulated to a fixed point such as a bracket 11b rigid with the floor of a vehicle (not shown), a nut 9 fixed in rotation, connected to move in translation with the element (not shown) to be adjusted and cooperative with the outer screw thread of the primary screw 10, a speed reducer 13 associated with an electric motor M for driving the primary screw 10 in rotation and in translation along the axis X—X of the latter, and anti-twist means for preventing a rotation of the speed reducer 13 relative to the nut 9.

The speed reducer 13 comprises a worm wheel 14 through which a smooth end portion of the screw 10 extends, this end portion being rigid with the worm wheel, and a worm 15 tangent to the wheel 14, these two component parts being mounted in the housing 16. The worm 15 is driven by the motor M in the known manner, for example by a flexible rotary coupling F.

The nut 9 is disposed in a housing B fixed to a slide G which is connected to move in translation with the element to be adjusted. The slide G may, for example, slide on a slideway fixed to the floor of a vehicle and carry a seat (not shown) whose position is to be adjusted.

This jack may advantageously be similar to that disclosed in the aforementioned French patent application and therefore will not be described in more detail.

The means for preventing a rotation of the speed reducer 13 relative to the nut 9, i.e. a twisting of the speed reducer about the axis X—X of the screws 10 and 11 and the nut 9 under the effect of the torque applied when the speed reducer 13 operates, comprise an articulated compass structure 18a consisting of two branches or yokes 18a, 18b which are articulated together by a pin 19.

The branch 18a is also articulated to the speed reducer 13, and the second branch 18b is articulated to a part of the jack which is fixed in rotation, namely the nut 9 in the presently-described embodiment. Each branch 18a, 18b has a generally Y (see FIG. 2a) or U shape whose base is extended by a projecting central end portion 30, 31 provided with a respective opening 32, the articulation pin 19 extending through these openings. The pin 19 is orthogonal to the general axis X—X and is transversely offset relative to this axis. Each branch 18a, 18b is constituted by two arms 18a1, 18a2, 18b1, 18b2 constituting a yoke, the ends of these arms being provided with openings and being articulated to distinct pins placed on each side of the primary screw 10 to allow the passage of the latter.

Thus, the arms 18a1, 18a2 are each articulated to pins 20a, 20b fixed to the housing 16, and the arms 18b1, 18b2, are articulated to respective pins 21a, 21b fixed to the nut 9. Geometric axes 20, 21 respectively correspond to the pins 20a, 20b and 21a, 21b.

The telescopic jack just described operates in the following manner:

The fixed motor M drives through the flexible shaft F, the worm 15 and the worm wheel 14 the primary screw 10 in rotation about the axis X—X of the latter. As the screw 11 is fixed and the hands of the inner and outer screw threads of the screw 10 are opposite, the nut 9, its housing B, the slide G and the element to be adjusted move in translation along the axis X—X to the extent of the sum of the two thread pitches of the screw threads of the screw 10 upon each rotation of the latter. At the same time, the speed reducer 13 moves with the screw 10 to the extent of a single thread pitch of the latter relative to the fixed screw 11. There is consequently a relative displacement of the speed reducer 13 relative to the nut 9 and consequently a pivoting of the arms of the compass structure 18 on one hand about the pins 20a, 20b, and 21a, 21b, and on the other hand about the pin 19.

The fact that the pin 19 is orthogonal but not concurrent with the axis X—X of the screw 10 permits this relative axial displacement of the speed reducer 13. The reaction torque is transmitted to the part 9 which is fixed in rotation through the geometric axis 20, the branch 18a, the pin 19, the branch 18b and the geometric axis 21.

This transmission of the reaction torque through the two branches of an articulated compass structure considerably reduces friction as compared with known prior arrangements. Indeed, the sliding friction of the known arrangements is here replaced by pivoting friction which involves a much smaller amount of work.

In the second embodiment (FIG. 4) of the jack, the yokes 18a, 18b forming the compass structure of FIGS. 1 to 3 are replaced by two branches constituted by links 22 and 23 articulated together by the common pin 19 and having ends which are respectively articulated to pins 24 and 25 carried by the speed reducer 13 and the nut 9a.

The two links 22, 23 are contained in a general plane parallel to the axis X—X and their ends remote from the pin 19 are guided by flat surfaces 16a and 9b respectively provided on the housing 16 and the nut 9a which constitute support surfaces for the compass structure thus formed.

The links 22, 23 have sufficient sectional size and the pins 24, 25 have a sufficient length to resist the developed forces.

In the third embodiment of the invention (FIG. 5), the means for preventing the speed reducer 13 from turning relative to the nut 9 comprise a spring strip 26 bent into a V shape and consequently having two arms whose ends 26a, 26b are respectively fixed to the speed reducer 13 and to a part of the jack which is fixed in rotation, namely the nut 9. The width 1 of this strip 26 is much larger than its thickness so that its bending inertia about an axis Y—Y parallel to the strip 26, i.e. in the direction of its bend, is very low.

On the other hand, its bending inertia about an axis Z—Z perpendicular to the axis Y—Y is very high, i.e. in the direction which opposes the rotation of the speed reducer 13 relative to the nut 9.

In the embodiment shown in FIG. 6, the spring strip 27 has a plurality of arms bent in the form of an accordion, namely four arms 27a, 27b, 27c, 27d, the ends 27a1 and 27d1 of the strip 27 being respectively fixed to the speed reducer 13 and to the nut 9. It will be understood that the number of bends in the strip 27 may vary, the latter having moreover bending characteristics similar to those of the strip of FIG. 5.

We claim:

1. Telescopic screw jack for adjusting a translatable housing, said jack comprising a primary tubular screw having an outer screw thread and an inner screw thread of opposite thread hands, a secondary screw cooperative with the inner screw thread and having an end for articulation to a fixed member, a nut fixed in rotation and connected to move in translation along a slide with said translatable housing to be adjusted and cooperative with the outer screw thread, a motor, a speed reducer connecting the motor to the primary screw for driving the primary screw in rotation, and means for preventing a rotation of the speed reducer relative to the nut, said means comprising an articulated compass structure comprising two branches articulated to each other, one of the branches being also articulated to the speed reducer while the other branch is articulated to a part of the jack which is fixed in rotation.

2. Jack according to claim 1, wherein the primary screw, the nut and the secondary screw have a general axis of rotation and a pin orthogonal to said general axis and transversely offset relative to said general axis articulates the two branches together.

3. Jack according to claim 2, wherein one of the branches of the articulated compass structure is articulated to said nut.

4. Jack according to claim 1, wherein each branch of the articulated compass structure has a general shape of a Y and defines two arms respectively articulated to two distinct articulation pins located on each side of the primary screw.

5. Jack according to claim 1, wherein each branch of the articulated compass structure has a general shape of a U and defines two arms respectively articulated to two distinct articulation pins located on each side of the primary screw.

6. Jack according to claim 1, wherein each branch of the articulated compass structure is formed by a link, and ends of said links are guided by flat support surfaces provided on the speed reducer and on said part of the jack which is fixed in rotation.

7. Jack according to claim 6, wherein said part of the jack which is fixed in rotation is said nut.

8. Telescopic screw jack for adjusting an element such as a vehicle seat, said jack comprising a primary tubular screw having an outer screw thread and an inner screw thread of opposite thread hands, a secondary screw cooperative with the inner screw thread and having an end for articulation to a fixed member, a nut fixed in rotation and connected to move in translation with said element to be adjusted and cooperative with the outer screw thread, a motor, a speed reducer connecting the motor to the primary screw for driving the primary screw in rotation, and means for preventing a rotation of the speed reducer relative to the nut, said means comprising a folded spring strip having ends respectively fixed to the speed reducer and to a part of the jack which is fixed in rotation, said strip having a width which is much larger than the thickness of the strip so that the bending inertia of the strip about an axis parallel to said strip, i.e. in the direction of the fold, is very low whereas the bending inertia of the strip about an axis perpendicular to said axis parallel to said strip is very high.

9. Jack according to claim 8, wherein the strip comprises two arms arranged in a V-shaped configuration.

10. Jack according to claim 8, wherein the strip is folded a plurality of times into an accordion configuration.

* * * * *